May 5, 1942. W. I. GLADFELTER ET AL 2,281,574
CURLING MACHINE
Filed Jan. 24, 1940 7 Sheets-Sheet 2

Fig. 2.

Inventors:
Wiltie I. Gladfelter,
Alva T. Bryant,
Attorneys.

May 5, 1942.  W. I. GLADFELTER ET AL  2,281,574
CURLING MACHINE
Filed Jan. 24, 1940      7 Sheets-Sheet 4

Inventors:
Wiltie I. Gladfelter,
Alva T. Bryant,
By Cushman Darby Cushman
Attorneys.

May 5, 1942.  W. I. GLADFELTER ET AL  2,281,574
CURLING MACHINE
Filed Jan. 24, 1940  7 Sheets-Sheet 7

Inventors:
Wiltie I. Gladfelter,
Alva T. Bryant,
By Cushman Darby & Cushman
Attorneys.

Patented May 5, 1942

2,281,574

UNITED STATES PATENT OFFICE 2,281,574

CURLING MACHINE

Wiltie I. Gladfelter and Alva Thomas Bryant, Philadelphia, Pa., assignors to Crown Cork & Seal Company, Inc., Baltimore, Md., a corporation of New York Application January 24, 1940, Serial No. 315,414

28 Claims. (Cl. 153—59)

This invention relates to a machine for flanging, beading or curling the ends of sheet metal articles, such as containers. More particularly, the invention is concerned with an automatic, high-speed machine for curling the neck ends of containers, to provide thereon a crown finish, adapted to receive a closure of the crown type.

It is an object of the invention to provide a machine which will take a line of semi-finished containers and automatically, in rapid succession, perform a plurality of curling operations on each container, to provide the desired structure at the neck end thereof.

It is a further object of the invention to provide a simplified, highly efficient, continuously operating machine of this type which is characterized by smoothness in operation, accessibility of parts and practically no likelihood of breakdown.

It is a further object of the invention to provide a curling machine wherein a plurality of different operations are performed simultaneously on a plurality of different containers, thereby increasing the speed of production of the machine as a whole.

The machine of the present invention is particularly adapted to form the crown finish on the necks of seamless, drawn can bodies of the type made by the machine and in accordance with the method of the pending applications of Amos and Edgar A. Calleson, Serial Nos. 129,068 and 280,650, filed, respectively, March 4, 1937 and June 22, 1939. In certain respects, the machine of the present application may be considered to be an improvement on the curling machine shown in the application of Amos and Edgar A. Calleson, Serial No. 294,182, filed September 9, 1939, since both machines operate on similar can bodies and provide a similar crown finish on the neck ends thereof.

One of the principal advantages of the present machine is that it is a continuously rotating machine which operates on a plurality of can bodies simultaneously, with a resulting increase in the rate of production.

Other objects and advantages of the invention will be apparent to one skilled in the art, from a consideration of the following description of a specific embodiment of the invention shown in the accompanying drawings, in which.

The machine illustrated in the accompanying drawings comprises a base 15 having an upper surface 16 which supports a pair of upwardly extending pedestals 17, 18 upon which there is secured, by caps 19, 20 and appropriate hold-down bolts, a horizontally disposed fixed shaft 21. An electric motor 22, disposed within a housing 23 in the base 15, drives a pinion 24 through suitable reduction gearing 25. Access to the motor may be had by means of doors or cover plates 26, suitably secured to the sides of the housing. The pinion 24 is in mesh with a large spur gear 27, freely rotatable on a shaft 28, journalled by bearings 29 in a sleeve portion 30 of the pedestal 18. An air clutch 31 establishes driving connection between the spur gear 27 and the shaft 28 whenever compressed air is delivered to the clutch by a conduit 32, in a well-known manner. A hood or guard 33, carried by the pedestal 18, encloses the gears 27, 24, and is provided with a central opening through which the clutch 31 may project.

The rear end of the shaft 28 carries a fixed pinion 35 in mesh with an enlarged spur gear 36, journalled for rotation by bearings 37, 38 on a reduced portion 39 of the non-rotatable shaft 21. Appropriate sealing flanges and packing glands are carried by the opposite ends of the hub 39 of the spur gear 36, to prevent the escape of lubricant which may be introduced into the space adjacent to the bearings by any appropriate means.

Figure 1:
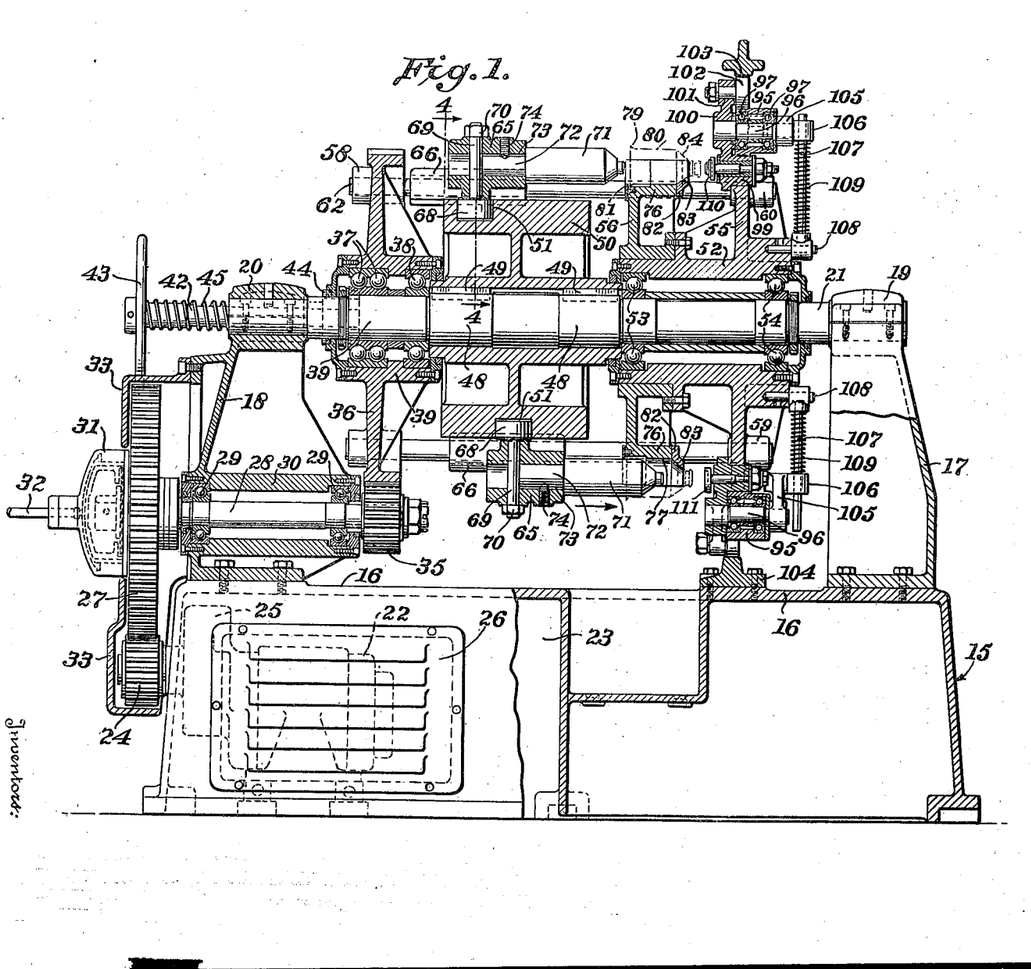
Figure 1 is a longitudinal section of the machine, taken substantially on line 1—1 of Figure 2, certain parts being shown in elevation.
Figure 3:
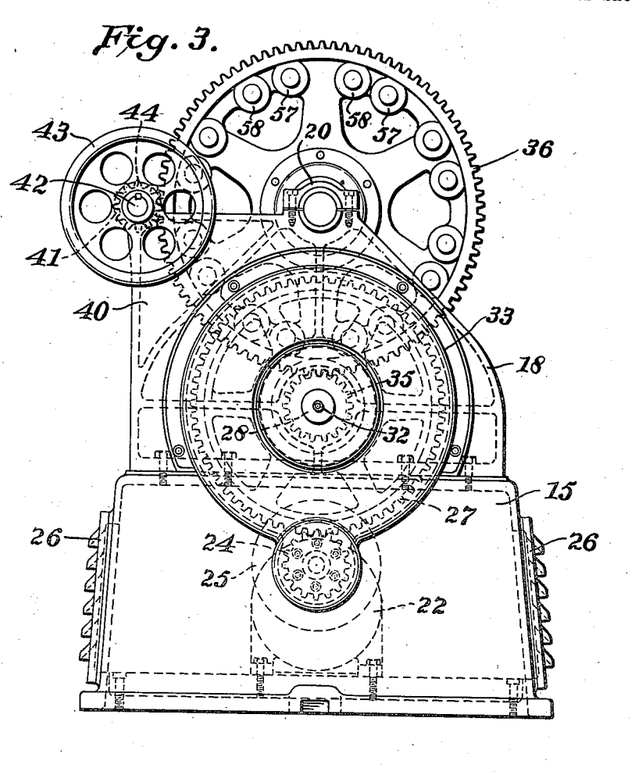
Figure 3 is an end elevation looking from the left of Figure 1.

As shown in Figure 3, the pedestal 18 is provided with a laterally projecting portion 40 having a bearing 41 carrying a shaft 42, handwheel 43 and pinion 44. The shaft 42 is longitudinally movable in the bearing 41, so that the pinion 44 may be moved axially into mesh with the gear 36 when it is desired to turn the machine over by hand. A coil compression spring 45 (Fig. 1) interposed between the handwheel 43 and the bearing 41, urges the shaft and the pinion rearwardly, out of mesh with the gear 36. Hence, the hand-operated pinion is normally out of mesh with the spur gear 36, which is the main driving gear for the machine.

On a central portion 48 of the horizontal, stationary shaft 21, there is fixedly secured by keys 49, a stationary cam barrel 50, having a cam groove 51 in its periphery, for purposes hereinafter described. Adjacent its other end, the shaft 21 carries a rotatable sleeve 52, journalled upon bearings 53, 54 and provided with appropriate lubricant sealing means in engagement with the shaft 21 and the hub of the cam barrel, respectively. The sleeve 52 has an integral outwardly projecting flange 55 serving as a curling die-supporting head or carrier, as hereinafter explained. Also, the sleeve 52 carries an outwardly projecting annular member 56 which constitutes a can body receiving head or dial.

The main spur gear 36 is provided with a plurality of pairs of hollow bosses 57, 58, while the flange 55 has similar bosses 59, 60 aligned therewith. A plurality of pairs of longitudinally extending tie-rods 61, 62 are disposed in respective pairs of openings in the members 36, 55, the rods also extending through appropriate holes in the can body-receiving dial 56. These rods tie the head 55, the dial 56 and the gear 36 together and cause them all to rotate in unison.

Figure 4:
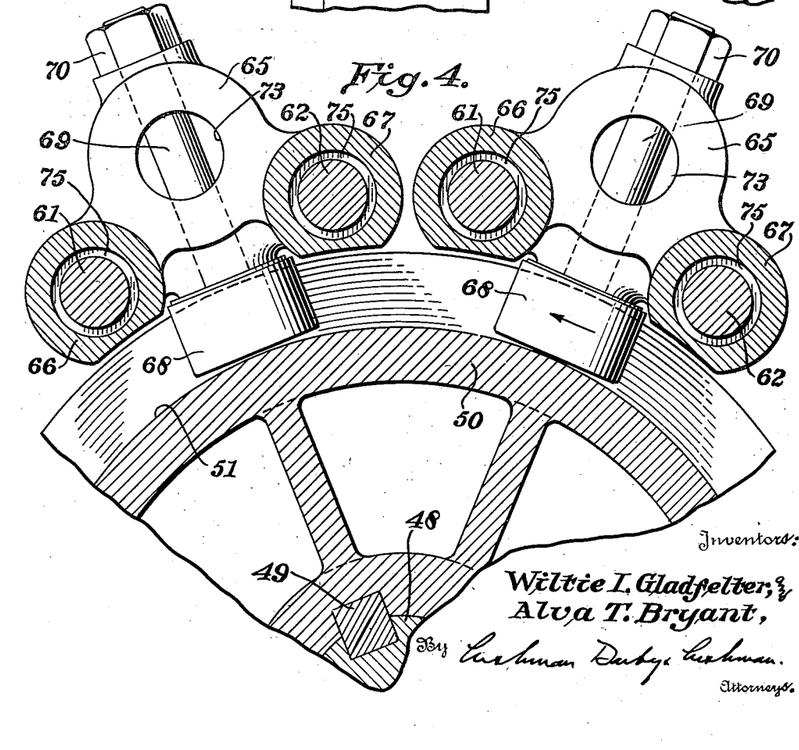
Figure 4 is an enlarged fragmentary section taken on substantially line 4—4 of Figure 1.
Figures 5, 6:
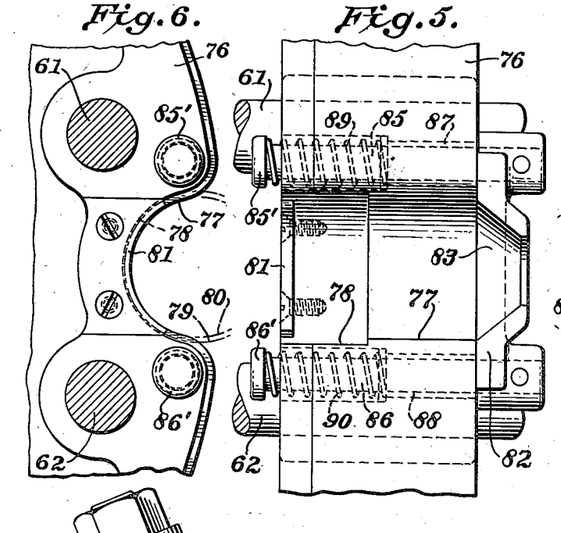
Figure 5 is a plan view of a container-receiving pocket.
Figure 6 is an elevation, partially in section, looking from the left of Figure 5.
Figure 7:
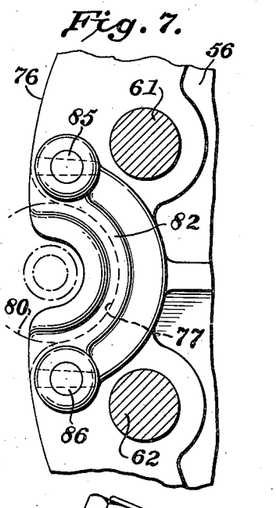
Figure 7 is a similar view taken from the right of Figure 5.

A plurality of carriages 65 (Figs. 1 and 4) are provided with integral, laterally projecting, hollow bosses 66, 67, slidably mounted for movement along the rods 61, 62 under the influence of cam following rollers 68 journalled on radially disposed shafts 69 projected through the carriages and appropriately secured in place by bolts 70, the rollers being disposed in the cam track 51. Mandrels 71 are supported by the carriages by means of rearwardly extending, reduced shaft portions 72 secured in the hollow interiors 73 of the carriages by set screws 74 or the like. As indicated in Figure 4, the bosses 66, 67 may be provided with bearing sleeves 75 closely fitting the rods 61, 62.

The can body receiving head or dial 56 (Figs. 1, 5–7) is provided with a circumferential flange 76 having peripheral pockets 77 formed therein in predetermined spaced relation, one disposed substantially midway between each pair of rods 61, 62. The flange, between the pockets, is disposed on a cylindrical surface concentric to the axis of the shaft 21. The rear ends of the pockets 77 are enlarged, as indicated at 78, providing a recess for the reception of the seaming flange 79 of container bodies 80. An upwardly projecting stripping flange 81 is preferably disposed in an appropriately machined slot at the end of the enlargement 78, to engage the end face of the flange, as hereinafter described.

At its forward end, each recess 77 is defined by a radially projecting chuck or end member 82, having a frusto-conical, rearwardly facing wall 83, in the embodiment illustrated, to engage the frusto-conical end wall 84 of the container 80. Of course, if containers having differently shaped ends are being manufactured, a differently shaped chuck or end member 82 will be employed.

Each chuck 82 is pinned or otherwise secured to rearwardly projecting rods 85, 86 slidably disposed in bores 87, 88 in the flange 76, the bores being enlarged at their rear ends to accommodate coil compression springs 89, 90 disposed between the heads 85', 86' of the rods and the ends of the enlargement. Therefore, the rods and the chuck carried thereby are constantly urged rearwardly toward the left in Figure 5, although, as hereinafter described, the chucks may be advanced forwardly toward the right with the containers when the latter are moved in that direction by the mandrels 71 to have their necks curled. The chucks 82 and their spring mountings serve as means for retracting the cans from the curling dies.

The curling die head or carrier 55 is provided with a plurality of rearwardly extending, hollow bosses 95 in which stub rock shafts 96 are journalled by appropriate bearings 97. Inwardly of bosses 95 there are arcuate openings 98, in which rearwardly projecting portions 99 of curling die holders 100 are disposed. Each die holder 100 is fixed to a rock shaft 96 for swinging movement about the axis thereof, under the influence of an upwardly projecting arm 101 carrying a cam following roller 102, disposed inwardly of a circular cam track 103, having a base 104 secured to the upper surface 16 of the main frame 15. Each rock shaft 96 carries a laterally projecting rock arm 105 connected at its outer end to a block 106 slidably mounted on a link 107 connected at its inner end to a pin 108 disposed in an appropriate bore in the end face of the rotatable sleeve 52. Compression springs 109 urge the blocks 106 outwardly, thereby tending to rock the shafts 96 in a counter-clockwise direction (Figs. 8 and 9) to move the cam following rollers 102 outwardly toward the cam track 103. As hereinafter described, and as indicated in Figure 9, the cam track 103 serves to swing the die holders and the associated parts in a clockwise direction, against the force of the springs 109.

Figure 10:
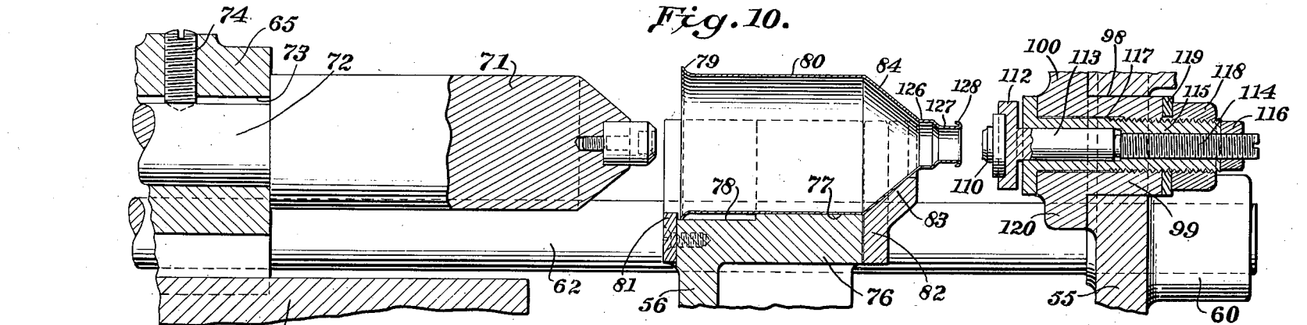
Figure 10 is an enlarged longitudinal section showing the relative position of certain of the elements substantially at the container infeed station.

The die holders 100 preferably carry two or more curling or flanging dies, adapted to be brought successively into operative position in alignment with the mandrels and can bodies by movement imparted to the die holders by the cam 103 and the springs 109. As illustrated in the accompanying drawings, the die holders each carry a first curling die 110 and a second curling, or curl setting die 111. As shown in Figure 10, each die may be carried in a head 112 secured to a spindle 113 having a threaded extension 114 adjustably mounted in the threaded bore of a sleeve 115. An appropriate lock nut 116 secures the spindle 113 in the desired, adjusted relation to the sleeve 115. The latter sleeve, in turn, is threaded into a bore 117 in the die holder 100 and is tightly clamped therein by a lock nut 118 and a washer 119. It will be understood that the second curling die 111 is mounted on a spindle 113' which is secured in a second bore in the die holder 100 in a manner similar to that shown in Figure 10. The die holder 100 is provided with a laterally projecting marginal flange 120, overlying the face of the die carrying head 55 around the margins of the slot 98, to transmit curling pressures to the head.

Figure 2:
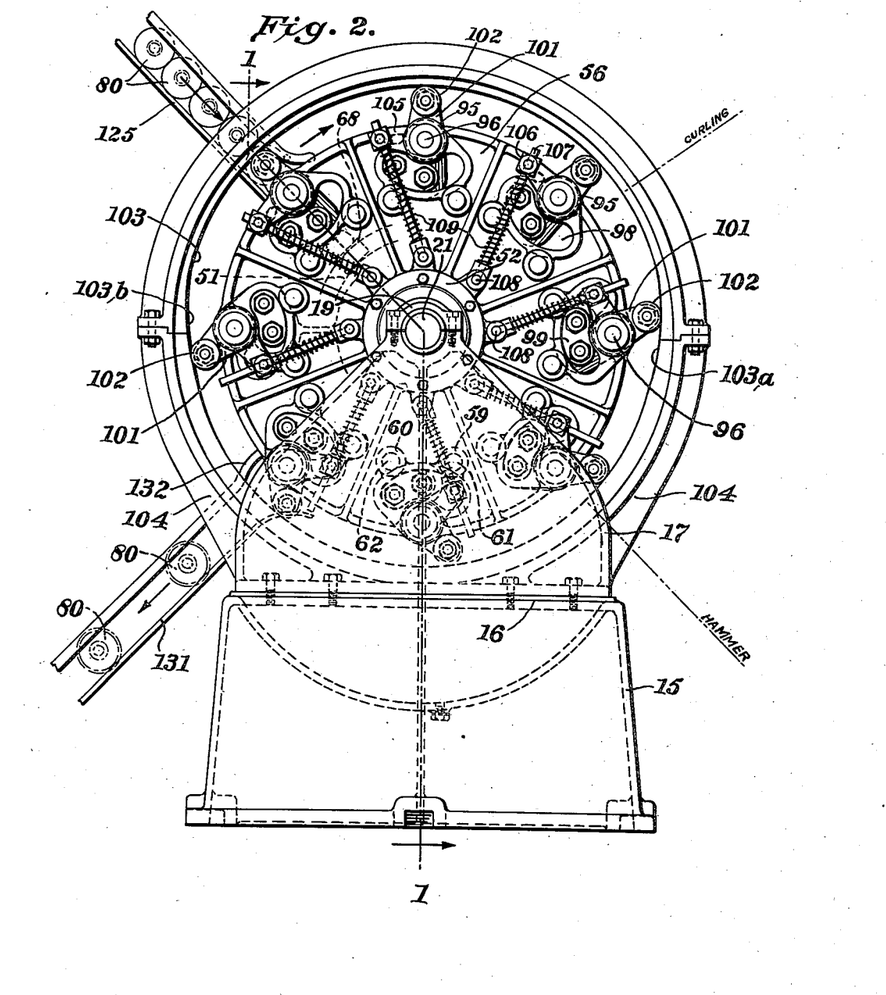
Figure 2 is an end elevation, looking from the right of Figure 1.

As indicated in Figure 2, a plurality of container bodies 80 are delivered by gravity along a chute 125 to the machine to have their necks curled. The lowermost can in the chute drops into a recess 77 in the can body supporting head or dial 56, as the latter passes under the chute. The line of cans then moves down one step and the next pocket 77 picks up another body. Of course, the invention is not limited to this particular method of delivering bodies to the pockets, as positive feeding means may be employed, similar to the mechanism shown in the pending application of Calleson et al. Serial No. 294,182, filed September 9, 1939. Preferably, the can bodies are of a type made in accordance with the pending applications of Calleson et al. Serial Nos. 129,068 and 280,650, filed, respectively, March 4, 1937 and June 22, 1939. As shown in Figure 10, these container bodies are thin-walled, drawn seamless members, each having a conical end wall 84, a lower neck portion 126, a reduced neck portion 127 and a beaded end 128, in which the metal is turned outwardly and downwardly relatively sharply on a small radius.

After a container has been received in one of the pockets 77, and as the machine rotates past the infeed position, the cam track 51 begins to advance the associated roller 68, the carriage 65 and the mandrel 71 toward the can-supporting dial and the can in the pocket. As represented diagrammatically in Figure 16, the can track 51 has a forwardly projecting inclined section 51a which serves to move the mandrel 71 into the interior of the can, with the conical end of the mandrel substantially in abutment with the inner face of the end wall 84 of the body. This portion of the cam groove, in the embodiment illustrated, extends around the circumference of the cam barrel a distance of 70°, immediately following a 10° dwell after the infeed position.

Figure 8:
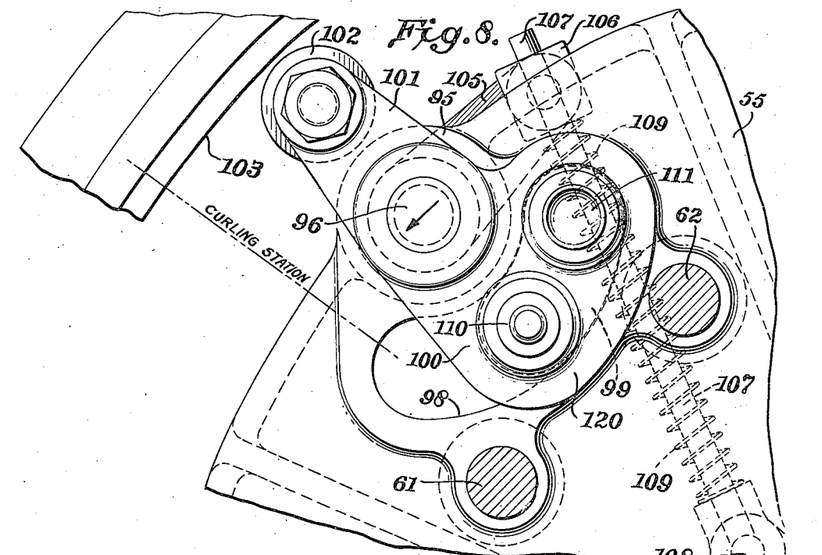
Figure 8 is a fragmentary elevation of a curling die holder and associated parts in one operative position.
Figure 9:
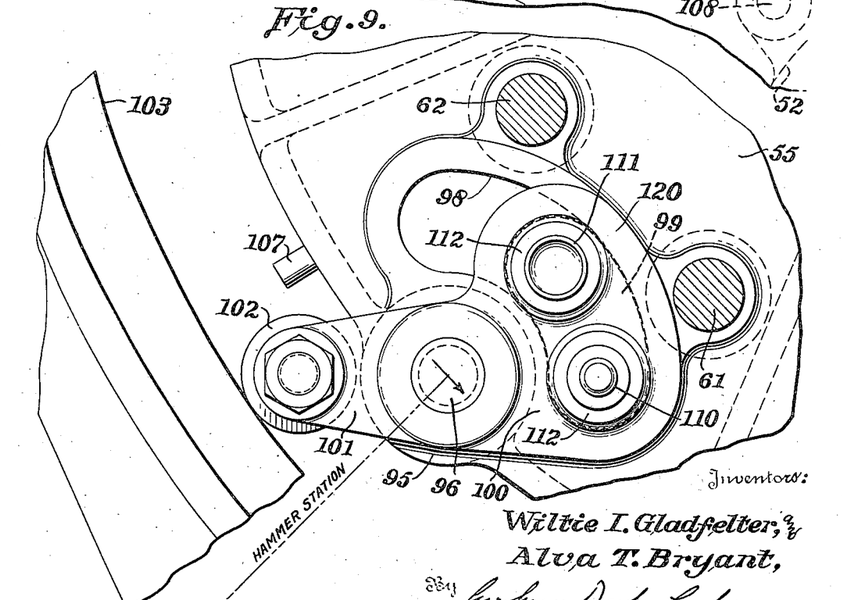
Figure 9 is a similar view showing the parts in the opposite position.

During this advancing movement of the mandrel, the corresponding die holder 100 is projected outwardly to its limit of movement under the influence of the spring 109, and the curling die 110 is in alignment with the mandrel and the neck of the container in the pocket 77, the position of the die holder being shown in Figure 8.

Figure 16:
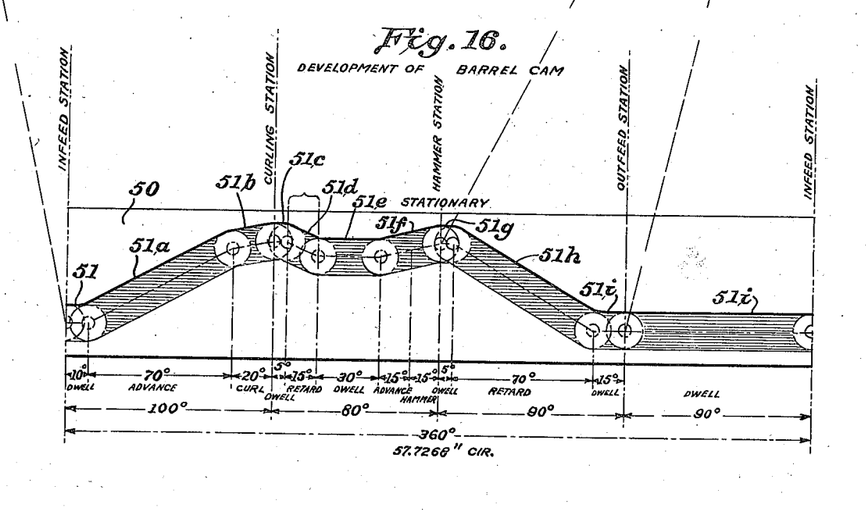
Figure 16 is a similar diagram of the cam which actuates the mandrels for the containers.

Immediately following this preliminary advance of the mandrel, there is a relatively gradually inclined cam groove section, represented in Figure 16 at 51b. This section serves to advance the mandrel further toward the curling die carrier, to project the neck of the container into operative, curling relation to the aligned die 110, to impart a further curl thereto, as indicated at 129 in Figures 11 and 12. At this stage of the operation, the preliminary sharp curl or bead 128 has been turned inwardly to form a substantially hemmed edge, as shown in the aforesaid figures. It has been found that a circumferential extent of 20° is sufficient for the cam track section 51b, preferably followed by a 5° dwell 51c. The mandrel is then retracted, as the machine continues to rotate, by a cam groove section 51d, which may be 15° in extent. The can is then moved rearwardly, out of engagement with the curling die 110 by the chuck 83 and the springs 89, 90.

Figures 11, 12, 13, 14:
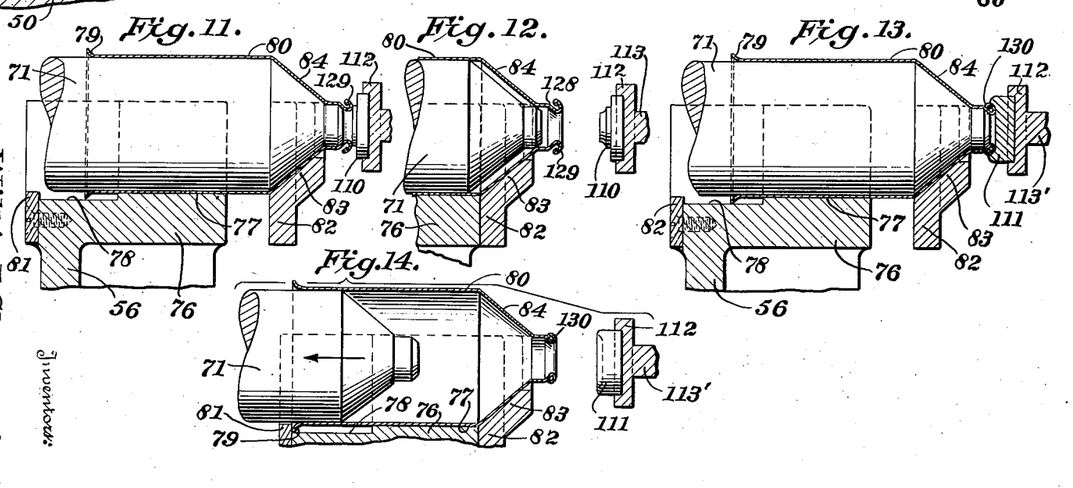
Figure 11 is a similar view, showing the first curling operation.
Figure 12 is a similar view after the first curling operation.
Figure 13 is a similar view showing the second curling operation or curl-setting step.
Figure 14 is a similar view prior to the outfeed station.
Figure 15:
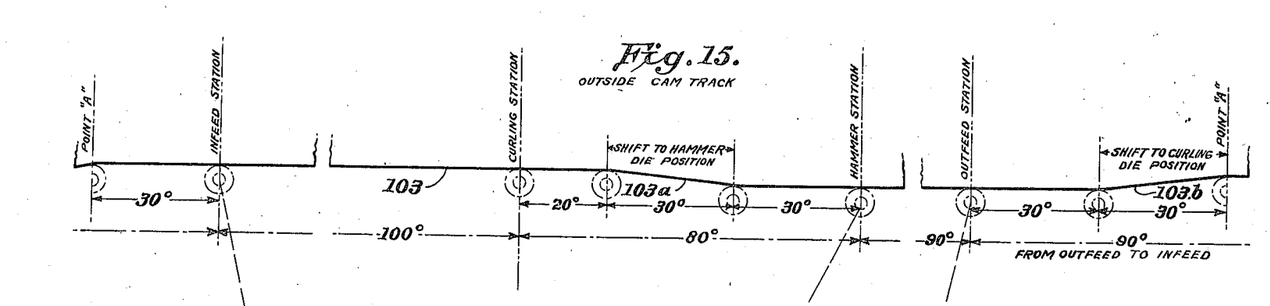
Figure 15 is a timing diagram of the can which controls the action of the curling die holders.

The retraction of the mandrels, to substantially the intermediate position shown in Figure 12, is followed by a 30° dwell, as indicated at 51e in Figure 16. During this dwell, the die holder 100 is shifted from the position shown in Figure 8, to that shown in Figure 9. This action is accomplished by the cam 103 which has an inwardly projecting portion 103a, adapted to move the cam following rollers 102 inwardly against the action of the springs 109, thereby to shift the die holders to their other limit of movement. A travel of 30° has been found sufficient to effect this shift of the dies, as indicated at 103a in Figure 15. At the conclusion of this swinging movement of the die holder, the curl-setting die or hammer die 111 is positioned in alignment with the container neck. The cam track 51 has a second forwardly projecting section 51f which again advances the mandrel and the can body to project the curled neck of the latter against the curl-setting die, as indicated in Figure 13. This section 51f extends preferably approximately 30°, followed by a 5° dwell. The action has been likened to a hammer blow or striking action, since the curled end of the neck is flattened somewhat and the open bead is tightly closed, as indicated at 130 in Figures 13 and 14. Immediately after the 5° dwell section 51g, the cam following roller 68 encounters a main mandrel retracting section 51h which serves to withdraw the mandrel entirely from the can body. This section preferably extends substantially 70° around the circumference of the cam barrel and the movement of the mandrel is relatively rapid. The can bodies again are withdrawn from the curl-setting dies by the spring-pressed chucks 83. They are prevented from moving rearwardly with the mandrels by the abutment or stripper plates 81 associated with the pockets 77, which engage the seaming flange 79 at the bottom ends of the bodies, as shown in Figure 14.

As each mandrel is thus withdrawn from a can body, the latter approaches a discharge chute 131 into which the cans fall by gravity, aided, if desired, by a deflector or guide plate 132. The mandrels remain retracted throughout the rotation of the machine from the discharge position to the infeed position, as a result of the inactive section 51i of the cam groove. When a new container body has been received in the pocket 77 at the infeed station, the mandrel is again projected forwardly by the cam track section 51a, and the cycle of operation is repeated. During the idle period of the machine, after the mandrel has been withdrawn, the cam following rollers 102, associated with the die holders 100, encounter an outwardly inclined section 103b of the cam track 103 which permits the springs 109 to swing the die holders outwardly to their limit of movement in that direction, again to align the curling dies 110 with the mandrels. Hence, the parts are restored to the desired position for the commencement of another cycle of operation.

Of course, since the operation of the machine is continuous, a plurality of cans will always be in the machine being operated upon at various stages of development. As a result, the speed of production of finished cans is extremely high.

In the foregoing description and in the accompanying drawings, the die holders 100 each carry two curling instrumentalities. Obviously, the invention is not limited to that particular number, since, if desired, three or more dies could be mounted on each die holder. In this connection, attention is called to the aforementioned Calleson et al. application Serial No. 294,182, wherein die holding slides, each carrying three curling dies are shown. If blanks having necks terminating in a raw edge, characterized by the absence of the preliminary curl 128, are used, the die holder and associated parts of the present machine may be modified by including three curling dies. In such case, the action of the mandrel may be modified to have three active strokes, and the cam 103 similarly changed, to provide three positions for the die holder, in each of which one of the dies will be aligned with the mandrel.

Although the machine of the invention has been described with considerable particularity in this specification and by reference to the accompanying drawings, it must be understood that the invention is not limited to the details thereof, but includes all modifications coming within the scope of the appended claims and their equivalents.

I claim:

1. A machine for curling the necks of containers, comprising means for moving a plurality of containers continuously along a predetermined path, a series of curling dies having curling grooves disposed opposite to and facing the necks of the containers, means for moving the dies along at least a portion of said path with the containers, and means actuated by said moving means for relatively moving the necks of the containers and dies axially toward each other into curling relation, to curl said necks by inserting the same into the curling grooves.

2. A can end curling machine comprising a plurality of mandrels mounted for revolution about a common axis, a plurality of curling dies facing the mandrels and mounted for revolution with the mandrels about said axis, means for feeding cans into alignment with the mandrels, and means for successively advancing the mandrels into the cans and advancing the mandrels and cans to project the ends of the cans into the dies.

3. A can end curling machine comprising a plurality of mandrels mounted for revolution about a common axis, a plurality of curling dies aligned with and facing the mandrels and mounted for revolution with the mandrels about said axis, means for feeding can bodies into position to be engaged by the mandrels, and cam-actuated means for advancing the mandrels with the cans engaged thereby toward the dies, to project the bodies into contact with the curling dies to curl the ends of the bodies.

4. A can end curling machine comprising a plurality of mandrels mounted for revolution about a fixed axis, a can body carrier and a curling die carrier mounted for rotation about said axis, a plurality of dies on the last-mentioned carrier, a stationary cam, and cam follower means associated wtih the mandrels for advancing the mandrels into the interiors of the can bodies and for advancing the mandrels with the can bodies thereon toward said dies to curl the ends of the can bodies during revolution of the mandrels about said axis.

5. A can end curling machine comprising rotatably mounted mandrel-supporting and curling die-supporting members, mandrels and curling dies carried thereby in substantially opposed relation, means for feeding can bodies into position between the mandrels and dies, a stationary cam and cam follower means associated with the mandrels for advancing the latter into the can bodies and for projecting the ends of the can bodies into cooperative relation with the curling dies.

6. A can end curling machine comprising a plurality of mandrels mounted for revolution about a common axis and for movement longitudinally of their own axes, a plurality of curling dies mounted for revolution about said axis and substantially aligned with the mandrels, means for feeding can bodies between the mandrels and the dies, and means for axially moving the mandrels into the can body interiors and for advancing the ends of the can bodies into curling relation to the dies.

7. A can end curling machine comprising a plurality of mandrels mounted for revolution about a common axis and for movement longitudinally of their own axes, a plurality of curling dies mounted for revolution about said axis and substantially aligned with the mandrels, means for feeding can bodies between the mandrels and the dies, a stationary cam disposed between the mandrels and said axis, and means associated with the mandrels and cooperating with said cam for moving the mandrels longitudinally of their axes into the can body interiors and for moving the can bodies into cooperative relation to the curling dies.

8. A can end curling machine comprising a rotatably mounted die carrier, a plurality of pairs of dies carried thereby, means rotatable with said carrier for supporting a plurality of can bodies, means for advancing and retracting the can bodies toward and from said carrier, and means for shifting the dies relative to the carrier and the can bodies, to present a can body to each die of one of said pairs of dies successively to perform two curling operations on each can body.

9. A can end curling machine comprising a series of axially movable mandrels mounted for rotation about a common axis, a die supporting head mounted for rotation about said axis, means for rotating the mandrels and said head about said axis, means for axially moving the mandrels toward and from the head during rotation thereof, an independent pair of dies for each mandrel movably supported on said head, and means actuated by the rotation of said head for moving the dies to align the individual dies of each pair successively with the associated mandrel.

10. A can end curling machine comprising a plurality of mandrels, means for moving the mandrels along a predetermined path, a die carrier, means for moving the carrier along a path in part adjacent the path of movement of the mandrels, a plurality of pairs of dies on the carrier, one pair for each mandrel, means for positioning can bodies on the mandrels with their ends facing the dies, means for relatively moving the mandrels and the carrier toward and away from one another during their movement along said paths, and means for relatively shifting the pairs of dies and the mandrels to bring each die of each pair successively into operative alignment with the end of the can body on the corresponding mandrel.

11. A can end curling machine comprising a plurality of mandrels, means for moving the mandrels along a circular path about a fixed axis, a die carrier, means for rotating the carrier about said axis, a plurality of pairs of dies on the carrier, one pair for each mandrel, means for positioning can bodies on the mandrels with their ends facing the die carrier, means for relatively moving the mandrels and carrier toward and away from one another, and means for relatively shifting the pairs of dies and the mandrels to bring each die of each pair successively into operative alignment with the end of the body on the corresponding mandrel.

12. A can end curling machine comprising means for supporting a plurality of can bodies for rotation about a common axis in predetermined spaced relation, a head mounted for rotation about the same axis, a plurality of sets of curling dies movably carried, one set for each can body supporting means, means for rotating the can body supporting means and the head in unison, and means actuated by the rotation of the head for moving the dies relative to the head, to present different dies of each set successively to the associated can body.

13. In a can end curling machine, a rotatable die supporting head, a plurality of die holders movably mounted on the head, a pair of dies carried by each holder, and means actuated by the rotation of the head for moving each die of each pair separately and successively into an operative position.

14. In a can end curling machine, a rotary die carrying head, a plurality of pivoted die holders carried by the head, a plurality of dies carried by each holder, and a cam follower operatively connected to each holder for swinging the latter during rotation of the head to bring each of the several dies carried by each holder successively into an operative position.

15. In a can end curling machine, a rotary die carrying head, a plurality of pivoted die holders carried by the head, a plurality of dies carried by each holder, a spring associated with each holder urging the same toward one limit of movement, and a cam and cam follower associated with each holder for moving the same to a plurality of positions to shift the dies successively to operative position.

16. A can end curling machine comprising rotatably mounted means for supporting a plurality of can bodies in predetermined spaced relation for axial movement relative to the support, a rotatably mounted die carrier, means for advancing and retracting the cans toward and from the die carrier a plurality of times during each rotation thereof, a plurality of movably mounted die holders on the carrier, a pair of dies on each holder, and means for moving the die holders to align successively the dies carried thereby with the associated can bodies.

17. A can end curling machine comprising rotatably mounted means for supporting a plurality of can bodies in predetermined spaced relation, a rotatably mounted die carrier, means for advancing and retracting the cans toward and from the carrier a plurality of times during each rotation thereof, a plurality of pivotally mounted die holders on the carrier, a pair of dies on each holder, means for aligning one die of each pair with an associated can body prior to the advancement thereof, and means operative during retraction of that can for shifting the position of the die holders and aligning the other die therewith.

18. A can body end curling machine comprising a fixed shaft, a pair of spaced heads rotatable about said shaft, a stationary cam fixed to the shaft between the heads, means disposed exteriorly of said cam and connecting said heads, a plurality of mandrels slidably supported on said connecting means, cam followers on the mandrels engaging said cam, whereby, upon rotation of the heads, the mandrels are reciprocated toward and from one of the heads, and curling dies carried by the last-mentioned head in substantial alignment with the mandrels.

19. A can body end curling machine comprising a fixed shaft, a pair of spaced heads rotatable about said shaft, a stationary cam fixed to the shaft between the heads, means disposed exteriorly of said cam and connecting said heads, a plurality of mandrels slidably supported on said connecting means, cam followers on the mandrels engaging said cam, whereby, upon rotation of the heads the mandrels are reciprocated toward and from one of the heads, a plurality of pairs of curling dies carried by the head, and means operated by the rotation of the head for bringing each die of each pair successively into alignment with one of said mandrels.

20. A can end curling machine comprising a fixed shaft, a die carrying head rotatable about said shaft, a stationary cam adjacent the head, mandrel supporting means projecting from the head and rotatable therewith, a plurality of mandrels axially slidable on said supporting means, cam followers operatively associated with the mandrels and engaging said cam, whereby, upon rotation of the head and the mandrel supporting means, the mandrels are reciprocated toward and from the head, and curling dies carried by the head in substantial alignment with the mandrels.

21. A can body end curling machine comprising a fixed, horizontal shaft, a die carrying head rotatably mounted on the shaft, a cam barrel fixed on the shaft and having a cam groove in its periphery, a plurality of mandrel supporting slideways projecting rearwardly from the head and disposed exteriorly of the cam barrel, mandrels on said slideways and having cam followers disposed in said groove, whereby the mandrels are reciprocated on their slideways toward and from the head upon rotation of the slideways relative to the cam barrel, and curling dies carried by said head in substantial alignment with the mandrels.

22. A can body end curling machine comprising a fixed, horizontal shaft, a die carrying head rotatably mounted on the shaft, a cam barrel fixed on the shaft and having a cam groove in its periphery, a plurality of mandrel supporting slideways projecting rearwardly from the head and disposed exteriorly of the cam barrel, mandrels on said slideways and having cam followers disposed in said groove, whereby the mandrels are reciprocated on their slideways toward and from the head upon rotation of the slideways relative to the cam barrel, a plurality of pairs of curling dies carried by said head, and cam actuated means for aligning the dies of each pair successively with one of the mandrels.

23. A rotary can end curling machine comprising rotatably mounted can supporting and die carrying heads, and means for projecting can bodies on the body supporting head toward and retracting the same from the die carrying head, said body supporting head having peripheral pockets formed therein, defined at their rear ends by outwardly projecting abutment flanges and at the forward ends by upwardly projecting, axially movable, rearwardly, spring-pressed end members.

24. In a can end curling machine comprising a rotary dial having can receiving pockets, a plurality of curling dies and means for projecting can bodies longitudinally of the pockets into the dies; means for retracting the bodies from the dies and for returning the same to normal position in the pockets, said means comprising a member associated with each pocket and positioned to engage a portion of the wall of the body in that pocket and mounted for movement with the body toward the associated die, and means for moving the member and the engaged body rearwardly from the die toward the dial.

25. A machine for curling the necks of conical ended cans comprising a rotary dial having can receiving pockets in its periphery, curling dies spaced from the forward ends of the pockets, and means for projecting the necks of the cans into the dies, each of said pockets having associated therewith an axially movable can end engaging chuck at the forward end thereof, and resilient means associated with the chuck urging the same rearwardly toward the pocket, whereby said chuck withdraws the can end from said die and returns the same to said pocket after the chuck and the can have been projected forwardly toward the die.

26. A machine for curling the necks of conical ended cans comprising a rotary can receiving dial having pockets in its periphery, curling dies spaced from the forward ends of the pockets and rotatable with the dial, means for projecting the cans longitudinally relative to the pockets and for forcing the necks thereof into the dies, and means for retracting the necks therefrom and for returning the cans to normal position in the pockets, said last-mentioned means comprising an end chuck for each pocket having a surface engaging the conical end of the can therein and mounted for movement with the can toward the dies under the influence of said projecting means, and spring means for returning the chuck and the can to normal position in the pocket after completion of a curling operation.

27. A can end curling machine comprising a revolvable can body supporting means, a plurality of curling dies having continuous, annular curling surfaces aligned with and facing the supporting means and disposed coaxially in circumferential alignment with the ends of the can bodies on said supporting means and revolvable in unison therewith, and means operated during the revolution of the bodies and dies for relatively moving the bodies and dies axially toward each other into curling relation to curl the ends of the bodies.

28. A can end curling machine comprising revolvable can body supporting means, a plurality of curling dies having continuous, annular curling surfaces aligned with and facing the supporting means and disposed coaxially in circumferential alignment with the ends of the can bodies on said supporting means and revolvable in unison therewith, and means operated by the revolution of said supporting means for axially advancing the can bodies toward the dies to present the ends of the bodies to the curling surfaces of the dies, to curl the ends of the bodies.

WILTIE I. GLADFELTER.
ALVA THOMAS BRYANT.